United States Patent
Wang et al.

(10) Patent No.: US 8,504,028 B2
(45) Date of Patent: Aug. 6, 2013

(54) METHOD, USER EQUIPMENT, AND SYSTEM FOR NETWORK SELECTION

(75) Inventors: Rui Wang, Beijing (CN); Guoqiao Chen, Beijing (CN); Juan Liu, Beijing (CN); Zhi Guan, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 33 days.

(21) Appl. No.: 13/168,347

(22) Filed: Jun. 24, 2011

(65) Prior Publication Data

US 2011/0256867 A1    Oct. 20, 2011

Related U.S. Application Data

(63) Continuation of application No. PCT/CN2009/071640, filed on May 5, 2009, and a continuation-in-part of application No. PCT/CN2008/073795, filed on Dec. 26, 2008.

(51) Int. Cl.
*H04W 4/00* (2009.01)

(52) U.S. Cl.
USPC .................. 455/434; 455/432.1; 370/328

(58) Field of Classification Search
USPC ......... 455/434–436, 518, 519, 63.1; 370/332, 370/328
See application file for complete search history.

(56) References Cited

U.S. PATENT DOCUMENTS

| | | | |
|---|---|---|---|
| 6,334,052 B1 | 12/2001 | Nordstrand | |
| 6,427,066 B1 | 7/2002 | Grube | |
| 6,917,807 B1 | 7/2005 | Vialen et al. | |
| 7,613,473 B2 * | 11/2009 | Yi et al. | 455/518 |
| 8,036,656 B2 * | 10/2011 | Jeong et al. | 455/434 |
| 8,095,156 B2 | 1/2012 | Iwamura | |
| 2002/0111180 A1 | 8/2002 | Hogan et al. | |
| 2002/0151304 A1 | 10/2002 | Hogan | |
| 2004/0157600 A1 | 8/2004 | Stumpert et al. | |
| 2007/0014919 A1 | 1/2007 | Hamalainen et al. | |
| 2007/0149191 A1 * | 6/2007 | Wu | 455/434 |
| 2007/0275724 A1 | 11/2007 | Kikuchi | |
| 2008/0267153 A1 | 10/2008 | Mukherjee et al. | |
| 2008/0280620 A1 | 11/2008 | Chin et al. | |
| 2010/0069069 A1 * | 3/2010 | Lee et al. | 455/435.2 |
| 2011/0256867 A1 | 10/2011 | Wang et al. | |

FOREIGN PATENT DOCUMENTS

CN    1356004 A    6/2002

(Continued)

OTHER PUBLICATIONS

Written Opinion of the International Searching Authority, PCT Application No. PCT/CN2009/071640, Applicant: Huawei Technologies Co., Ltd., et al., Mailing date: Sep. 10, 2009, 4 pages.
Written Opinion of the International Searching Authority, PCT Application No. PCT/CN2008/073795, Applicant: Huawei Technologies Co., Ltd., et al., Mailing date: Sep. 17, 2009, 3 pages.

(Continued)

*Primary Examiner* — Nizar Sivji
(74) *Attorney, Agent, or Firm* — Slater & Matsil, L.L.P.

(57) ABSTRACT

A method, user equipment (UE) and system relates to communications technologies, and in particular, to a network selection technology for a UE on a mobile communication network. The method includes obtaining a public land mobile network and closed subscriber group identity (PLMN/CSG ID) combination parameter of a network that covers a current location; querying an allowed CSG list according to the PLMN/CSG ID combination parameter; and selecting a network according to a query result.

7 Claims, 4 Drawing Sheets

FOREIGN PATENT DOCUMENTS

| | | |
|---|---|---|
| CN | 1516509 A | 7/2004 |
| CN | 1703111 A | 11/2005 |
| CN | 1805577 A | 7/2006 |
| CN | 101080099 A | 11/2007 |
| EP | 1 681 888 A1 | 7/2006 |
| WO | WO 2006/125506 A1 | 11/2006 |
| WO | WO 2008/081816 A1 | 7/2008 |
| WO | WO 2008/088168 A1 | 7/2008 |
| WO | WO 2010/072035 A1 | 7/2010 |
| WO | WO 2010/072063 A1 | 7/2010 |

OTHER PUBLICATIONS

Supplementary European Search Report received in European Application No. 09834016.9, mailed Dec. 23, 2011, 8 pages.

* cited by examiner

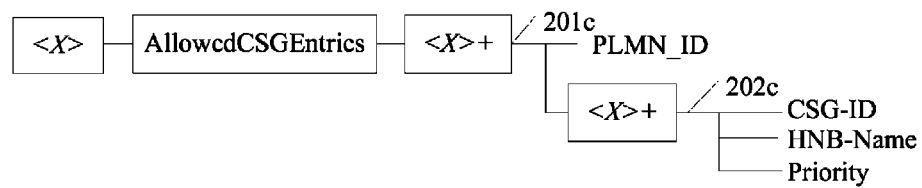
FIG. 2c
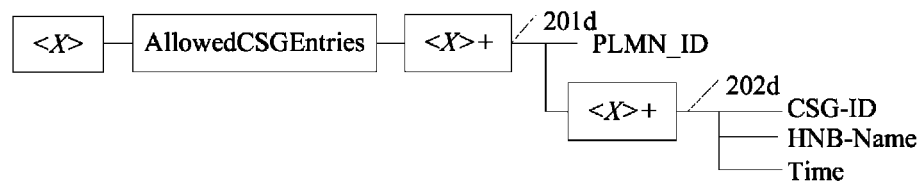
FIG. 2d
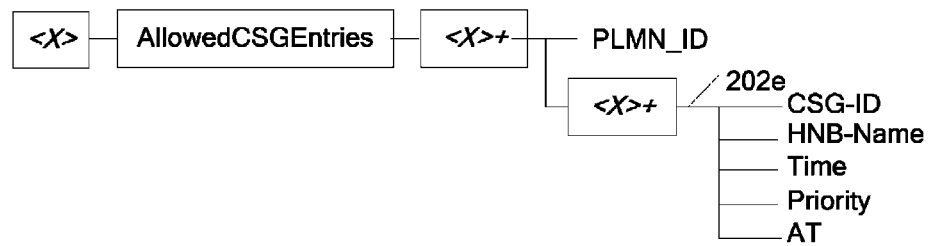
FIG. 2e
FIG. 2

METHOD, USER EQUIPMENT, AND SYSTEM FOR NETWORK SELECTION

This application is a continuation of International Application No. PCT/CN2009/071640, filed on May 5, 2009, and is a continuation-in-part of International Application No. PCT/CN2008/073795, filed on Dec. 26, 2008, both of which are hereby incorporated by reference in their entireties.

TECHNICAL FIELD

The present invention relates to communications technologies, and in particular, to a network selection technology for a user equipment (UE) on a mobile communication network.

BACKGROUND

On a 3rd Generation Partnership Project (3GPP) network, to obtain network services, a UE must perform the following three operations: public land mobile network (PLMN) selection, cell selection, and location registration. After completing the three operations, the UE camps on a network and then can use services provided by the network. The three operations must be performed in sequence, and may be performed repeatedly. The PLMN selection is to select a network. Each network has a unique PLMN identity (ID), and the UE may obtain the PLMN ID through cell broadcast. The PLMN selection must comply with a priority. After the UE selects a PLMN, the UE begins to select a cell that must belong to the selected PLMN. In addition, the signal quality of the cell must meet the requirement. The preceding two operations are performed locally by the UE through the cell broadcast service. Then, the UE initiates a procedure for the location registration. To provide more services, an operator may install a mini home NodeB for a home user, so that the user may access the network through a cell of the home NodeB at fewer expenses. Therefore, the operator needs to grant the user rights to determine who can access the cell. A user group that is allowed to access the cells of a home NodeB (or multiple home NodeBs, for example, in a scenario in which the NodeBs are applied in a company) is called a closed subscriber group (CSG). Each CSG has a CSG ID corresponding to the cells. Those cells are also called CSG cells. The UE and the network may store an allowed CSG list for each user. The allowed CSG list records the CSG IDs of CSG services that each user is allowed to access. When the UE knows that the cell is a CSG cell through the cell broadcast, the UE needs to judge whether the CSG ID of the cell is stored in the allowed CSG list; if so, the UE may camp on the network; otherwise, the UE needs to reselect another cell.

During the implementation of the present invention, the inventor discovers at least the following problems in the prior art:

A user cannot access a desired CSG cell if the CSG cell is not on a network with an access priority.

SUMMARY OF THE INVENTION

Embodiments of the present invention provide a method, UE, and system for network selection to solve the problem that a user cannot access a desired CSG cell if the CSG cell is not on a network with an access priority.

To solve the above technical problem, a method for network selection includes:

obtaining a PLMN/CSG ID combination parameter of a network that covers a current location, querying an allowed CSG list according to the PLMN/CSG ID combination parameter, and selecting a network according to a query result.

A UE for network selection includes:

a parameter obtaining module, configured to obtain a PLMN/CSG ID combination parameter of a network that covers a current location; and a network selecting module, configured to: query an allowed CSG list according to the PLMN/CSG ID combination parameter obtained by the parameter obtaining module, and select a network according to a query result.

A system for network selection includes a UE.

The UE obtains a PLMN/CSG ID combination parameter of a network covering a current location, queries an allowed CSG list according to the PLMN/CSG ID combination parameter, and selects a network according to a query result.

By using the method, UE and system for network selection in embodiments of the present invention, the problem that a user cannot access a desired CSG cell if the CSG cell is not on a network with an access priority is solved. In this way, the user can better obtain desired network services, therefore enjoying better user experience.

BRIEF DESCRIPTION OF THE DRAWINGS

FIGS. 2*a*-2*e*, collectively FIG. 2, are schematic diagrams illustrating an allowed CSG according to a second embodiment of the present invention;

DETAILED DESCRIPTION OF ILLUSTRATIVE EMBODIMENTS

For better understanding of the objective, technical solution and merits of the present invention, the following describes the present invention in detail with reference to the accompanying drawings and six embodiments.

The first embodiment of the present invention provides a method for network selection.

Figure 1:
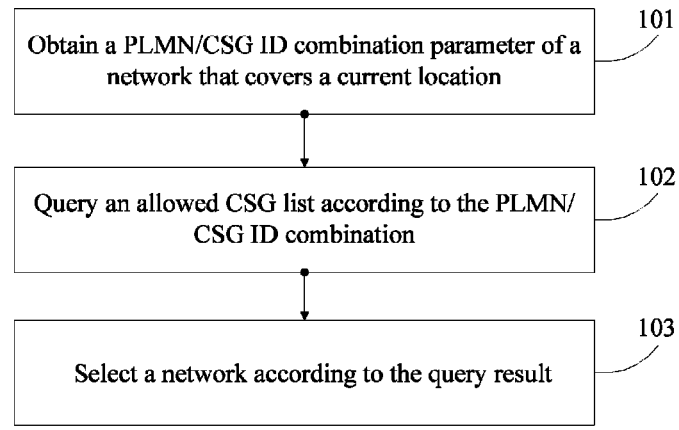
FIG. 1 is a flowchart of a method according to a first embodiment of the present invention.

As shown in FIG. 1, the method includes the following steps.

Step 101: Obtain a PLMN/CSG ID combination parameter of a network that covers a current location.

There may be multiple PLMN/CSG ID combinations. By receiving information about a cell broadcast channel that covers the current location, the UE obtains an ID parameter of the network that covers the current location. The UE obtains a PLMN ID of each cell from the broadcast channel and information about whether the cell is a CSG cell. If the cell is a CSG cell, the UE obtains a CSG ID of the cell. The UE obtains the following PLMN/CSG ID combination.

TABLE 1

| PLMN ID | CSG ID |
|---------|--------|
| PLMN1 | None |
| PLMN2 | CSG1 |

TABLE 1-continued

| PLMN ID | CSG ID |
|---|---|
| PLMN2 | None |
| PLMN2 | CSG2 |
| PLMN3 | CSG3 |

Step 102: Query an allowed CSG list according to the PLMN/CSG ID combination parameter.

Specifically, if multiple PLMN/CSG ID combination parameters are obtained, the allowed CSG list is queried according to the PLMN/CSG ID combination parameter. A query result may be as follows: more than two PLMN/CSG ID combinations are included in the allowed CSG list; or only one PLMN/CSG ID combination is included in the allowed CSG list; or no PLMN/CSG ID combination is included in the allowed CSG list.

Step 103: Select a network according to the query result.

The step of selecting a network according to the query result includes selecting the network corresponding to a PLMN ID in the PLMN/CSG ID combination if the PLMN/CSG ID combination parameter is included in the allowed CSG list.

The step of selecting a network according to the query result further includes selecting a network from the PLMN/CSG ID combinations included in the allowed CSG list according to a priority of the PLMN ID or an auxiliary parameter of the allowed CSG list if more than two PLMN/CSG ID combinations are included in the allowed CSG list.

The step of selecting a network according to the query result further includes prompting the PLMN/CSG ID combinations to a user if more than two PLMN/CSG ID combinations are included in the allowed CSG list. A network is selected according to the PLMN/CSG selected by the user.

In addition, the step of selecting a network according to the query result further includes selecting a network corresponding to the PLMN ID in the PLMN/CSG ID combination if only one PLMN/CSG ID combination is included in the allowed CSG list. Alternatively, a network is selected according to a priority of the PLMN ID if no PLMN/CSG ID combination is included in the allowed CSG list.

The allowed CSG list records the combination of the ID of the CSG cell that the UE is allowed to use and the ID of the PLMN which the CSG cell belongs to. The auxiliary parameter of the allowed CSG list includes but is not limited to one or a combination of the following: one of a priority of the PLMN/CSG ID combination, a name of the home NodeB corresponding to the CSG ID, an access technology supported by the CSG cell, and access time of the CSG cell. The allowed CSG list may be stored on a subscriber identity module (SIM) card or on a storing module of the UE.

According to the query result obtained in step 102, the following assumptions are made.

Assumption 1: The PLMN2/CSG1 ID combination and the PLMN2/CSG2 ID combination are included in the allowed CSG list at the same time.

In this case, the UE may select a network and a CSG cell according to the auxiliary parameter recorded in the allowed CSG list, for example, one or a combination of the priority of the PLMN/CSG ID combination, the access technology supported by the CSG cell and the access time of the CSG cell. The UE selects a network according to priorities of multiple PLMN/CSG ID combinations, or judges whether the UE is allowed to access a PLMN/CSG corresponding to the PLMN/CSG ID combination at the current time according to the allowed access time of the CSG cell, or judges whether the UE can access the network according to the access technology supported by the PLMN/CSG combination, or judges whether the UE may access the network according to any combination of the priority of the PLMN/CSG ID combination, the access technology supported by the CSG cell, and the access time of the CSG cell.

The UE may also prompt the PLMN2/CSG1 ID combination and the PLMN2/CSG2 ID combination included in the allowed CSG list to the user, and select a network and a CSG cell according to the ID combination selected by the user.

Assumption 2: The PLMN2/CSG1 ID combination, PLMN2/CSG2 ID combination, and the PLMN3/CSG3 ID combination are included in the allowed CSG list at the same time.

In this case, the UE may select a corresponding network and a CSG cell according to priorities of the PLMN2 and the PLMN3 and/or the auxiliary parameter recorded in the allowed CSG list, for example, one or a combination of the priority of the PLMN/CSG ID combination, the name of the CSG cell, the access time of the CSG cell, and the access technology supported by the CSG cell. The priority of the PLMN may be defined by using a default PLMN priority definition method used for network selection in the prior art.

The UE may also prompt the PLMN2/CSG1 ID combination, PLMN2/CSG2 ID combination, and the PLMN3/CSG3 ID combination included in the allowed CSG list to the user, and select a network and a CSG cell according to the ID combination selected by the user.

Assumption 3: One of the PLMN2/CSG1 ID combination, PLMN2/CSG2 ID combination, and the PLMN3/CSG3 ID combination is included in the allowed CSG list.

In this case, the UE selects a corresponding network and a CSG cell according to the ID combination included in the allowed CSG list.

Assumption 4: No PLMN/CSG ID combination is included in the allowed CSG list. In this case, the UE initiates a network selection function according to the priority of the PLMN, and performs network registration.

A step may be added to the method for network selection in this embodiment, that is, in the case of network selection due to power-on or movement of the UE, a registered public land mobile network (RPLMN), a home public land mobile network (HPLMN) or an equivalent home PLMN (EHPLMN) is selected with priority.

The main merit of the technical solution provided in this embodiment lies in that the method for network selection is provided, which can solve the problem that a user cannot access a desired CSG cell when the CSG cell is not on a network with an access priority.

The second embodiment illustrates components of an allowed CSG list. As shown in FIG. 2, details of the second embodiment are described in the following paragraphs.

Figure 2A:
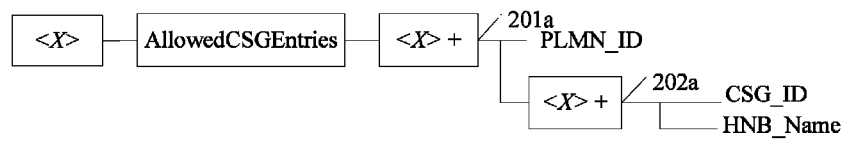

The allowed CSG list is stored in the form of Open Mobile Alliance Device Management Management Object (OMA DM MO). As shown in FIG. 2a, all the CSG areas that the user is allowed to access are classified by networks, and each network stores multiple allowed CSG IDs. The <x>/AllowedCSGEntries/<x>+ node 201a is an extension node on which the allowed CSG IDs on each mobile network are stored. Therefore, the <x>/AllowedCSGEntries/<x>+/PLMN_ID node stores the PLMN ID of the network. The <x>/AllowedCSGEntries/<x>+/<x>+ node 202a parallel with the <x>/AllowedCSGEntries/<x>+/PLMN_ID node is also an extension node, on which multiple IDs of CSGs accessible by the user on the PLMN and the name of the home NodeB corresponding to the CSG ID are stored. The name of the home NodeB may be displayed to the user, so that the user can judge the type of the network, for example, Zhang San's home. Therefore, in the CSG list, three parameters indicating that the user is allowed to access the CSG area are stored, namely, PLMN ID, CSG ID, and name of the home NodeB. The PLMN/CSG ID may uniquely identify a radio coverage area that uses the PLMN/CSG ID, and the name of the NodeB may be easily recognized by the user. However, at present, multiple access modes are available, and the UE generally has dual-mode functions. In addition, an operator may provide different tariff standards for different access modes, which may cause dual-mode/multi-mode mobile phone users to select an access mode in some cases.

For example, a user has a dual-mode mobile phone that supports both the wideband code division multiple access (WCDMA) and long term evolution (LTE) technologies. The home NodeB is accessible only by CSG members and air interface resources are shared only among the CSG members. Therefore, the user joins the CSG of one of the user's friends to ensure stable data transmission, that is, the user is allowed to access the NodeB of the user's friends. In addition, the home NodeB of the user's friends supports the WCDMA access function. However, the operator provides the user a preferential policy. If the user accesses the network by using the LTE technology, the tariff is lower. Therefore, the user does not hope to access the WCDMA network when the user does not need to perform data transmission (for example, download files online).

Figure 2B:
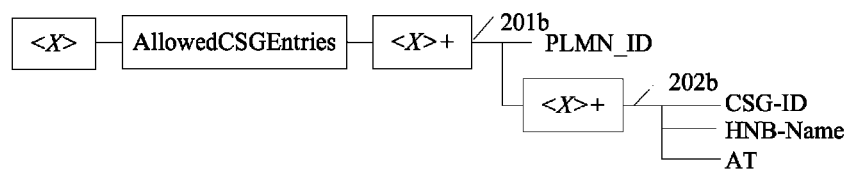

To solve such problem, an access technology (AT) parameter needs to be added to the allowed CSG list to describe the access technology supported by the CSG. A preferred access technology may be set on the mobile phone to facilitate the UE in network selection. After the AT parameter is added to the allowed CSG list, the UE may also judge whether to access the CSG cell according to the AT parameter. FIG. 2b illustrates an allowed CSG list after modification.

As shown in FIG. 2b, a new AT parameter is extended on the <x>/AllowedCSGEntries/<x>+/<x>+ node 202b; the AT parameter is used to indicate an access technology ID and includes but is not limited to radio access technologies applicable to the 2nd generation (2G), 2.5th generation (2.5G), 3rd generation (3G), and post-3G mobile networks, such as the global system for mobile communications (GSM), general packet radio system (GPRS), code division multiple access (CDMA), WCDMA, LTE, and CDMA2000. The allowed CSG list stored on the UE includes an entry: PLMN1-CSG1-WCDMA, indicating that the UE is allowed to access a CSG cell with the CSG1 ID on the PLMN1 network and supports the WCDMA access mode.

When the UE moves to a network, the UE obtains two PLMN/CSG ID combinations included in the allowed CSG list. The first combination is PLMN1/CSG1 that uses the LTE access mode. The second combination is PLMN2/CSG2 that uses the WCDMA access mode. Because the preferred access mode of the UE is WCDMA, the UE automatically selects the PLMN2/CSG2 combination for network registration.

In addition, the allowed CSG list may also include a Priority parameter, so that the UE can easily select a corresponding network and a CSG cell according to the priority when the multiple PLMN/CSG ID combinations obtained by the UE are included in the allowed CSG list. FIG. 2c illustrates an allowed CSG list with an additional Priority parameter. As shown in FIG. 2c, a new parameter Priority is extended on the <x>/AllowedCSGEntries/<x>+/<x>+ node 202c. The Priority parameter is used to indicate a priority of the PLMN/CSG ID combination. Table 2 lists the PLMN/CSG ID combinations obtained by the UE.

Assuming that the PLMN2/CSG1 ID combination, the PLMN2/CSG2 ID combination, and the PLMN3/CSG3 ID combination are included in the allowed CSG list, the UE may determine a network that needs to be selected by comparing the Priority parameters in the preceding ID combinations. Assuming the preceding three combinations are arranged as follows in ascending order according to the priorities: PLMN3/CSG3 ID combination, PLMN2/CSG1 ID combination, and PLMN2/CSG2 ID combination, the UE selects the PLMN2/CSG2 ID combination as the network and the CSG cell.

In addition, the allowed CSG list may also include a Time parameter that indicates the allowed access time of the corresponding CSG cell and is used to control the user access effectively. Some CSG cells, for example, the home NodeB set for a company, cover only the area where the company is located; during the off-duty time, the home NodeB does not serve common users. If the home NodeB is used only by employees on the night shift, an allowed access time of the CSG cell may be added to the allowed CSG list. When the UE finds a PLMN/CSG combination, the UE needs to judge whether the PLMN/CSG combination is stored in the allowed CSG list and whether the current time is the allowed access time of the CSG; if the current time is the allowed access time, the UE lists the PLMN/CSG combination in an option or displays the PLMN/CSG combination to the user for selection; otherwise, the UE does not perform the preceding operation.

When the network receives an update location request from some CSG cells, the network needs to judge whether the allowed CSG list of the user stores the CSG ID and decides, according to the allowed access time of the CSG, whether to allow the user to access the network through the CSG cell.

FIG. 2d illustrates an allowed CSG list with an additional Time parameter.

As shown in FIG. 2d, a new parameter Time may be extended on the <x>/AllowedCSGEntries/<x>+/<x>+ node 202d. The Time parameter is used to indicate the allowed access time of the CSG cell in the PLMN/CSG ID combination. The PLMN/CSG ID combinations obtained by the UE are shown in Table 1.

Assuming that the PLMN2/CSG1 and the PLMN3/CSG3 are included in the allowed CSG list, the UE queries the allowed access time of the PLMN2/CSG1 and the PLMN3/CSG3; if the allowed access time of the PLMN2/CSG1 is T0800:T1700, the access is permitted between 8:00 and 17:00; if the allowed access time of the PLMN3/CSG3 is T1200:T2000, the access is permitted between 12:00 noon and 20:00. If the current time is 10:00, the UE selects the PLMN2/CSG1 ID to initiate a network selection procedure.

In addition, any combination of the preceding AT parameter, Priority parameter, and Time parameter may be extended in the allowed CSG list. As shown in FIG. 2e, three new parameters such as the AT parameter, the Priority parameter, and the Time parameter are extended on the <x>/AllowedCSGEntries/<x>+/<x>+ node 202e. In this way, when multiple PLMN/CSG ID combinations obtained by the UE are included in the allowed CSG list, the UE may further determine which PLMN/CSG ID combination the network registration needs to be initiated to according to the extended parameters.

The main merit of the technical solution provided in this embodiment lies in the method for extending parameters in the allowed CSG list. A desired network and a desired CSG cell may be further selected by extending parameters in the PLMN/CSG ID combinations in the allowed CSG list.

The third embodiment of the present invention provides a UE for network selection.

Figure 3:
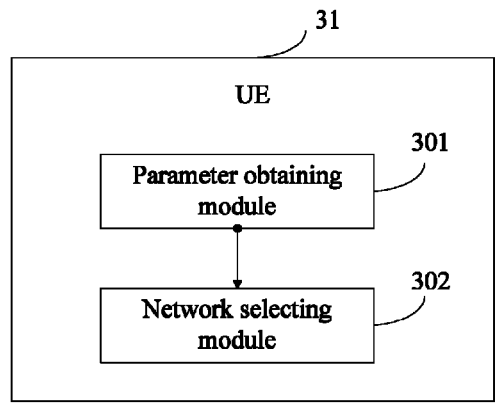
FIG. 3 is a schematic diagram illustrating a UE according to a third embodiment of the present invention.

As shown in FIG. 3, the UE 31 includes but is not limited to mobile network devices applicable to 2G, 2.5G, 3G, and post-3G that are used for wireless communications, for example, mobile phones, personal digital assistants (PDAs), and intelligent portable terminals. The UE 31 includes a parameter obtaining module 301 that is configured to obtain a PLMN/CSG ID combination parameter of a network that covers the current location. A network selecting module 302 is configured to query an allowed CSG list according to the PLMN/CSG ID combination parameter obtained by the parameter obtaining module 301, and select a network according to a query result.

The main merit of the technical solution provided in this embodiment lies in that the UE for network selection is provided, which can solve the problem that a user cannot access a desired CSG cell when the CSG cell is not on a network with an access priority.

The fourth embodiment of the present invention provides another UE for network selection.

Figure 4:
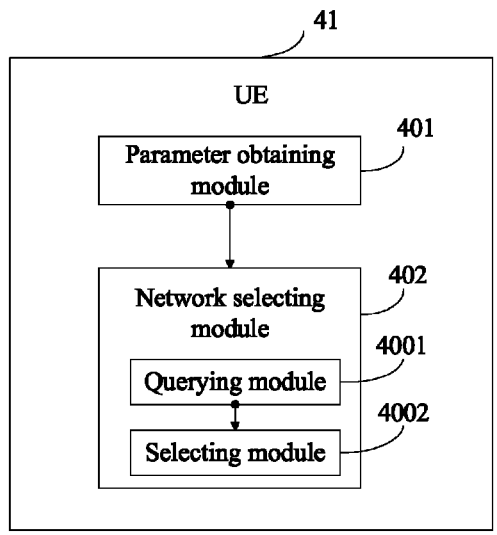
FIG. 4 is a schematic diagram illustrating a UE according to a fourth embodiment of the present invention.

As shown in FIG. 4, the UE 41 includes but is not limited to mobile network devices applicable to 2G, 2.5G, 3G, and post-3G that are used for wireless communications, for example, mobile phones, PDAs, and intelligent portable terminals. The UE 41 includes a parameter obtaining module 401 that is configured to obtain a PLMN/CSG ID combination parameter of a network that covers the current location. A network selecting module 402 is configured to query an allowed CSG list according to the PLMN/CSG ID combination parameter obtained by the parameter obtaining module 401, and to select a network according to the query result.

A querying module 4001, located inside the network selecting module 402, is configured to query whether the PLMN/CSG ID combination obtained by the parameter obtaining module 401 is included in the allowed CSG list. A selecting module 4002, located inside the network selecting module 402, is configured to select a network according to the PLMN ID in the PLMN/CSG ID combination in the allowed CSG list obtained by the querying module 4001.

The selecting module 4002 is further configured to select a network according to the priority of the PLMN ID or the auxiliary parameter of the allowed CSG list if the querying module 4002 finds that more than two PLMN/CSG ID combinations are included in the allowed CSG list.

The selecting module 4002 is further configured to select a network corresponding to the PLMN ID in the PLMN/CSG ID combination if the querying module 4001 finds that only one PLMN/CSG ID combination is included in the allowed CSG list.

The selecting module 4002 is further configured to select a network according to the priority of the PLMN ID if the querying module 4001 finds that no PLMN/CSG ID combination is included in the allowed CSG list.

The main merit of the technical solution provided in this embodiment lies in that the UE for network selection is provided, which solves the problem that a user cannot access a desired CSG cell when the CSG cell is not on a network with an access priority.

The fifth embodiment of the present invention provides a system for network selection.

The system includes a UE, a NodeB, and a server. The system solves the problem that the user cannot access a desired CSG cell when the CSG cell is not on a network with an access priority. The UE includes but is not limited to mobile network devices applicable to 2G, 2.5G, 3G, and post-3G that are used for wireless communications, for example, mobile phones, PDAs, and intelligent portable terminals. The NodeB and the server include but are not limited to a computer and an intelligent device. The intelligent device is capable of processing signals and includes but is not limited to a mobile Internet device, fixed Internet device, and mobile network device applicable to 2G, 2.5G, 3G, and post-3G.

Figure 5:
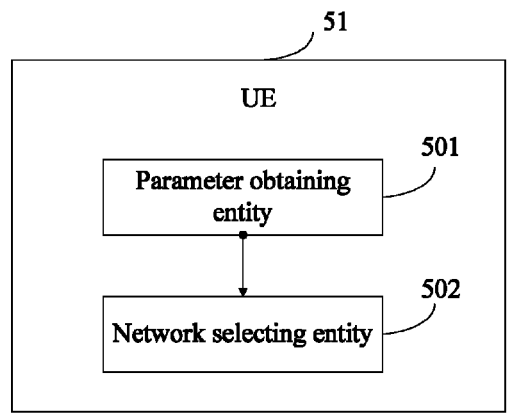
FIG. 5 is a schematic diagram illustrating a UE according to a fifth embodiment of the present invention.

As shown in FIG. 5, the system includes a UE 51. The UE 51 is configured to obtain a PLMN/CSG ID combination parameter of a network that covers the current location, query an allowed CSG list according to the PLMN/CSG ID combination parameter, and select a network according to the query result.

The UE 51 includes a parameter obtaining entity 501 that is configured to obtain a PLMN/CSG ID combination parameter of a network that covers a current location. A network selecting entity 502 is configured to query an allowed CSG list according to the PLMN/CSG ID combination parameter obtained by the parameter obtaining entity 501, and to select a network according to a query result.

The main merit of the technical solution provided in this embodiment lies in that the UE for network selection is provided, which solves the problem that a user cannot access a desired CSG cell when the CSG cell is not on a network with an access priority, therefore bringing better experience to the user.

The sixth embodiment of the present invention provides a system for network selection.

The system includes: a UE, a NodeB, and a server. The system solves the problem that the user cannot access a desired CSG cell when the CSG cell is not on a network with an access priority. The UE includes but is not limited to mobile network devices applicable to 2G, 2.5G, 3G, and post-3G that are used for wireless communications, for example, mobile phones, PDAs, and intelligent portable terminals. The NodeB and the server include but are not limited to a computer and an intelligent device. The intelligent device is capable of processing signals and includes but is not limited to a mobile Internet device, fixed Internet device, and mobile network device applicable to 2G, 2.5G, 3G, and post-3G.

Figure 6:
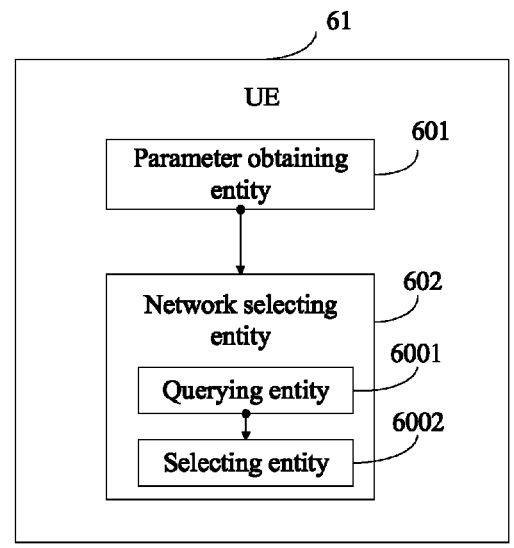
FIG. 6 is a schematic diagram illustrating a UE according to a sixth embodiment of the present invention.

As shown in FIG. 6, the system includes a UE 61. The UE 61 is configured to obtain a PLMN/CSG ID combination parameter of a network that covers the current location, query an allowed CSG list according to the PLMN/CSG ID combination parameter, and select a network according to a query result.

The UE 61 includes a number of entities. A parameter obtaining entity 601 is configured to obtain a PLMN/CSG ID combination parameter of a network that covers a current location. A network selecting entity 602 is configured to query an allowed CSG list according to the PLMN/CSG ID combination parameter obtained by the parameter obtaining entity 601 and to select a network according to a query result. A querying entity 6001, located inside the network selecting entity 602, is configured to query whether the PLMN/CSG ID combination obtained by the parameter obtaining entity 601 is included in the allowed CSG list. A selecting entity 6002, located inside the network entity 602, is configured to select a network according to the PLMN ID in the PLMN/CSG ID combination in the allowed CSG list obtained by the querying entity 6001.

The selecting entity 6002 is further configured to select a network according to the priority of the PLMN ID or the auxiliary parameter of the allowed CSG list if the querying entity 6001 finds that more than two PLMN/CSG ID combinations are included in the allowed CSG list.

The selecting entity 6002 is further configured to select a network corresponding to the PLMN ID in the PLMN/CSG ID combination if the querying entity 6001 finds that only one PLMN/CSG ID combination is included in the allowed CSG list.

The selecting entity 6002 is further configured to select a network according to the priority of the PLMN ID if the querying entity 6001 finds that no PLMN/CSG ID combination is included in the allowed CSG list.

The main merit of the technical solution provided in this embodiment lies in that the system for network selection is provided, which solves the problem that a user cannot access a desired CSG cell when the CSG cell is not on a network with an access priority, therefore bringing better experience to the user.

The seventh embodiment of the present invention provides a method for network selection.

The specific description of the method is provided in the first embodiment, and therefore is not described again here. According to the method provided in the first embodiment, the UE obtains a PLMN/CSG ID combination parameter of a network that covers a current location, queries an allowed CSG list according to the PLMN/CSG ID combination parameter, and selects a network according to the query result. If the UE selects a network manually according to the query result, after the UE selects a network according to the PLMN/CSG ID combination parameter selected by the user, when the UE leaves the CSG cell corresponding to the CSG ID in the PLMN/CSG ID combination parameter and needs to re-select a network, the UE changes to select a network automatically. The automatic selection method may be implemented with reference to the method of the first embodiment of the present invention.

The main merit of the technical solution provided in this embodiment lies in that the method for network selection is provided, which solves the problem that the UE cannot initiate network selection manually when leaving the previously accessed CSG cell after the network is selected manually.

The eighth embodiment of the present invention provides a method for network selection.

The specific description of the method is provided in the first embodiment. If the UE selects a network according to the method provided in the first embodiment of the present invention, the UE may initiate communication with the network, such as a radio resource control (RRC) connection request, and a tracking area update (TAU) request; when the network determines that the time when the UE initiates the CSG cell access, that is, the time when the UE sends the preceding communication message, does not meet the time requirement of the CSG cell, the network sends a reject message that carries an information ID and/or sending time (for example, the RRC connection reject or TAU reject message) to the UE, where the information ID indicates the cause for rejecting the access. For example, error code 27 indicates that the time when the UE requests to access the CSG cell does not meet the requirement. The sending time indicates the time when the network judges the access requested by the user, which may be the time when the network sends the reject message or the time when the network receives a request or any time between the preceding two time segments. When the UE receives the sending time, the UE may display the time to the user and notify the user of the current time of the network, so that the user can understand why the access is rejected.

The main merit of the technical solution provided in this embodiment lies in that the method for network selection is provided, which solves the problem of subsequent processing if the time when the UE initiates access to the CSG cell does not meet the time requirement of the CSG cell after the UE selects a network.

It may be understood by those skilled in the art that the accompanying drawings are merely schematic drawings of exemplary embodiments, and that modules, entities or processes in the accompanying drawings are not mandatory for implementing the present invention.

It is understandable by those skilled in the art that the terminal, server, and modules or entities in the system may be distributed in the terminal, server and system provided in embodiments of the present invention according to the description of the embodiments or be located in one or multiple devices provided in embodiments of the present invention. The modules or entities in the preceding embodiments may be combined into one module or entity, or split into several sub-modules or sub-entities.

The sequence numbers of the embodiments provided above are for clear description only, and do not represent the order of preference.

Through the descriptions of the preceding embodiments, those skilled in the art may understand that the present invention may be implemented by hardware only or by software and a necessary universal hardware platform. Based on such understanding, the technical solution of the present invention may be embodied in the form of a software product. The software product may be stored in a nonvolatile storage medium, which may be a compact disk-read only memory (CD-ROM), a universal serial bus (USB) flash disk, or a removable hard disk. The software product includes a number of instructions that enable a computer device (a personal computer, a server, or a network device) to execute the methods provided in the embodiments of the present invention.

The above descriptions are merely exemplary embodiments of the present invention, but not intended to limit the scope of the present invention. Any modification, variation, or replacement made without departing from the spirit and principle of the present invention should fall within the scope of the present invention. Therefore, the protection scope of the present invention is subject to the appended claims.

What is claimed is:

1. A method for network selection performed by a user equipment, the method comprising:
   obtaining a public land mobile network and closed subscriber group identity (PLMN/CSG ID) combination parameter of a network that covers a current location;
   querying an allowed CSG list according to the PLMN/CSG ID combination parameter;
   determining that more than two PLMN/CSG ID combinations are comprised in the allowed CSG list according to a query result; and
   selecting a network from the PLMN/CSG ID combinations comprised in the allowed CSG list according to a priority of a PLMN/CSG ID combination or an auxiliary parameter of the allowed CSG list;
   wherein the network selecting comprises querying whether the PLMN/CSG ID combination is comprised in the allowed CSG list, selecting a network according to a PLMN ID in the PLMN/CSG ID combination comprised in the allowed CSG list, and selecting a network according to a priority of a PLMN/CSG ID combination or an auxiliary parameter of the allowed CSG list when more than two PLMN/CSG ID combinations are comprised in the allowed CSG list.

2. The method of claim 1, wherein the auxiliary parameter of the allowed CSG list comprises at least one of access time of a CSG cell or an access technology supported by the CSG cell.

3. The method of claim 1, wherein, after selecting the network, the method further comprises receiving a reject message that carries an information ID and/or sending time from the selected network when the time of initiating access to a CSG cell does not meet a time requirement of the CSG cell.

4. A user equipment (UE) for network selection, the UE comprising:
   a parameter obtaining module, configured to obtain a public land mobile network and closed subscriber group identity (PLMN/CSG ID) combination parameter of a network that covers a current location; and
   a network selecting module, configured to query an allowed CSG list according to the PLMN/CSG ID combination parameter obtained by the parameter obtaining module and select a network according to a query result, wherein the network selecting module comprises:
      a querying module, configured to query whether the PLMN/CSG ID combination obtained by the parameter obtaining module is comprised in the allowed CSG list; and
      a selecting module, configured to select a network according to a PLMN ID in the PLMN/CSG ID combination comprised in the allowed CSG list, and wherein the selecting module is further configured to select a network according to a priority of a PLMN/CSG ID combination or an auxiliary parameter of the allowed CSG list when the querying module finds that more than two PLMN/CSG ID combinations are comprised in the allowed CSG list.

5. The user equipment of claim 4, wherein the auxiliary parameter of the allowed CSG list comprises at least one of the following access time of a CSG cell or an access technology supported by the CSG cell.

6. A system for network selection, comprising a user equipment (UE), wherein the UE comprises:
   a parameter obtaining entity, configured to obtain the PLMN/CSG ID combination parameter of the network that covers a current location; and
   a network selecting entity, configured to query the allowed CSG list according to the PLMN/CSG ID combination parameter obtained by the parameter obtaining entity, and select a network according to a query result, wherein the network selecting entity comprises:
      a querying entity, configured to query whether the PLMN/CSG ID combination obtained by the parameter obtaining module is comprised in the allowed CSG list; and
      a selecting entity, configured to select a network according to a PLMN ID in the PLMN/CSG ID combination comprised in the allowed CSG list, and wherein the selecting entity is further configured to select a network according to a priority of a PLMN/CSG ID combination or an auxiliary parameter of the allowed CSG list when the querying entity finds that more than two PLMN/CSG ID combinations are comprised in the allowed CSG list.

7. The system of claim 6, wherein the auxiliary parameter of the allowed CSG list comprises at least one of access time of a CSG cell or an access technology supported by the CSG cell.

* * * * *